May 6, 1924.
J. G. SWAIN
WHEEL AND DEMOUNTABLE RIM
1,493,442
Filed March 16, 1920
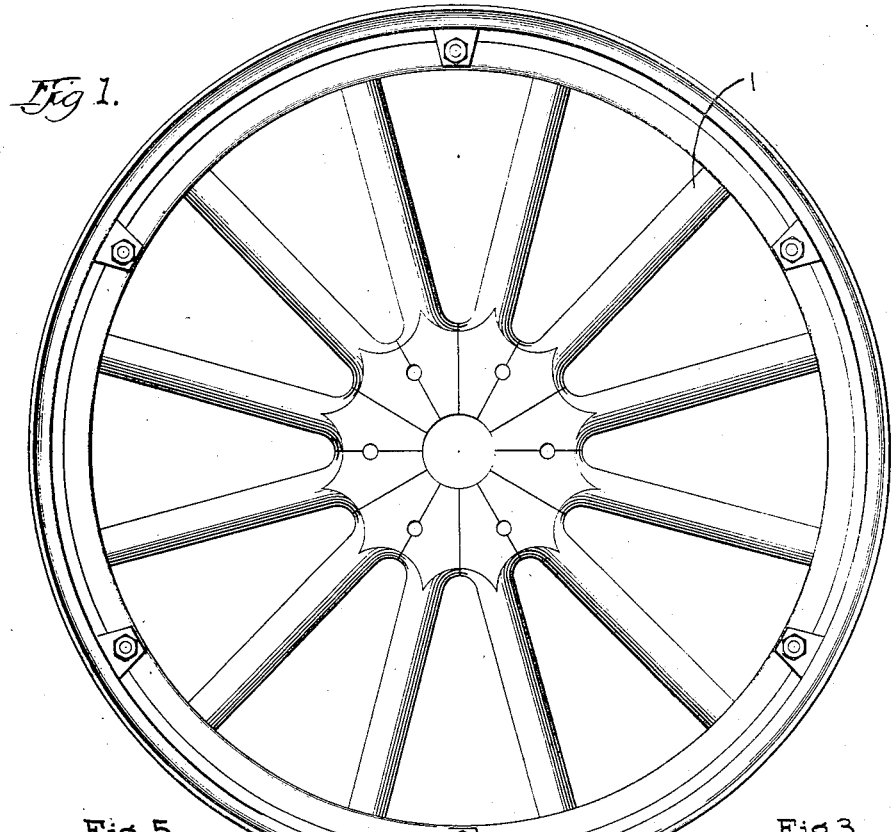
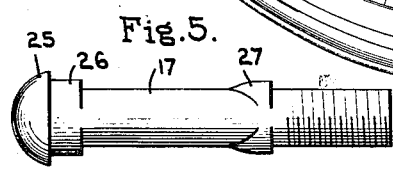
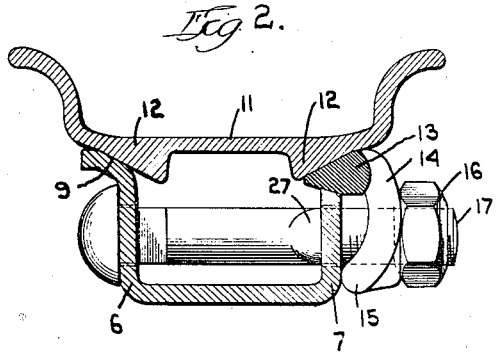
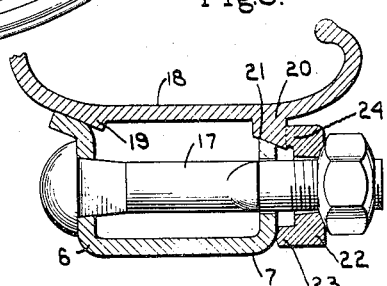
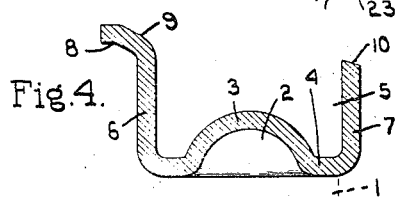
Inventor
Joseph G. Swain

Patented May 6, 1924.

1,493,442

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Application filed March 16, 1920. Serial No. 366,203.

*To all whom it may concern:*

Be it known that I, JOSEPH G. SWAIN, a citizen of the United States, residing at Akron, in the county of Summit, State of Ohio, have invented certain new and useful Improvements in Wheels and Demountable Rims, of which the following is a specification.

This invention relates to a novel and useful advance in the construction of wheels and demountable rims therefor, and is designed to form a light and economical wheel construction which will be easy to manufacture and simple in operation without sacrificing the stability of the construction. The structure shown herein, embodies features of improvement over former constructions and is especially designed for use in hollow fellied wheels.

In the drawings:

Fig. 1 is a side elevation of a wheel structure.

Fig. 2 is a cross section showing the manner of mounting the rim.

Fig. 3 is a cross-section of a modified form of mounting.

Fig. 4 is a cross-section through the felly or fixed rim at the spoke end.

Fig. 5 is a detail of the bolt.

While the description is somewhat detailed, it is not the purpose or intention to limit this application to the details shown, as modifications and changes may be made which do not depart from the spirit of this invention.

The wheel is composed of a plurality of spokes 1, the outer ends of which are formed with reduced rounded knobs or projections 2. These projections are intended to be seated in recesses 3, formed in the base 4 of the channel-shaped felly or fixed rim 5. When the wheel is constructed, the felly or fixed rim is formed slightly larger than its final or finished circumference and the spokes are assembled with the rounded ends seated in the recess. The entire assembly is then placed in a press or tire setter and the fixed rim pressed inwardly to compact the wheel together. In this manner the ends of the spokes are firmly seated in the felly. While this method of wheel manufacture is preferred by me, it will be understood that such practice is not essential, as any standard or usual method may be used in forming the wheel with the parallel flanges.

The wheel comprises the fixed rim which has been referred to and which is a channel or U-shaped, being formed with two parallel flanges, the inner one of which is designated by the numeral 6 and the outer one by the numeral 7. The inner flange 6 may be formed at its outer edge with a bearing surface or seat for one side of the demountable rim. This seat is numbered 8 and may be formed either as shown in Figs. 2 and 4 or as shown in Fig. 3. The outer surface of the seat is formed with an inclined or beveled surface 9 which forms the bearing surface for the rear side of the rim.

The other flange 7 is somewhat lower than the flange 6 and is also formed with a beveled or inclined surface 10. It will be noted that in the form shown in Fig. 3 the two surfaces 9 and 10 are parallel, whereby the rim will seat accurately wherever it comes to rest laterally of the wheel.

The rim shown in the form of the invention illustrated in Fig. 2 and designated 11 is of the straight side type, being formed with two oppositely turned beveled ribs 12, the inner one of which seats on the bevel 9. Between the outer rib 12 and the surface 10 is interposed a wedge ring 13, which is forced into place by a clamp plate 14, fulcruming at 15 on the side of the felly, being forced into place by a nut 16 threaded on the end of a bolt 17 passing through the parallel flanges of the felly. In place of the separate clamping or wedge ring any suitable or usual form of wedging device may be used. A sufficient number of bolts are located about the wheel to securely hold the rim.

In the form of invention illustrated in Fig. 3, the rim 18 is illustrated as of the clincher type, one side of which may be formed with a beveled rib 19 which rests on the seat 9. The form of rim shown in this figure is an example of an alternative type of demountable rim in which the rim is formed with two surfaces contacting directly with the tapering or inclined surfaces of the flanges of the fixed rim. The outer side of the rim which is here shown is formed with a second rib 20 which is somewhat deeper than the rib 19, its lower surface 21 being beveled to seat directly on the surface 10. A clamping plate 22 is placed over the outer end of each bolt 17, being formed with a projection 23 which bears or fulcrums against the lower side of the wheel felly. The upper or outer end of the plate is formed with a second projection 24 which bears against the surface of the rib 20, so that as the nut 16 is tightened, the rim will be forced into place seating on the two surfaces 9 and 10.

The bolt 17, which is shown in detail in Fig. 5 is formed with a head 25, immediately behind which is formed a square or oval shaped enlargement 26 adapted to fit in a similarly shaped opening in the side of the felly, so that the bolt is prevented from turning. At a point on the bolt, directly behind the flange 7, are formed two projecting lugs or abutments 27, which are located directly in the rear of the flange. The purpose of these abutments is to support the outer flange 7 and prevent it being crushed or bent inwardly by pressure of the nut as the clamping plate is tightened, the other flange 6 being prevented from being bent inwardly by its contact with the rim.

Having disclosed specific forms of the invention, it is not confined to such form only, but may be altered or modified as may seem desirable to one of mechanical skill and still fall within the scope of the invention.

I claim:

1. In a wheel construction, a fixed rim, two outwardly extending parallel flanges on said rim, a plurality of bolts passing through said flanges, a demountable rim supported by the parallel flanges, clamping plates on the ends of said bolts for securing the rim on the wheel, nuts on the ends of the bolts for drawing the clamping plates against one of said flanges, and integral lugs formed on the bolts in the rear of said flange, said flange bearing against said lugs, the other flange bearing against the rim and prevented from collapsing thereby.

2. In a wheel construction, a fixed rim, two outwardly extending parallel flanges on said rim, a plurality of bolts passing through said flanges, a demountable rim supported by the parallel flanges, clamping plates fulcruming on one of said flanges, nuts on the ends of said bolts for drawing the clamping plates against the said flange, an integral lug formed on each bolt in the rear of said flange, said flange bearing against said lug and a non-rotative engagement between the bolts and one of the flanges.

3. In a wheel construction, the combination of a fixed rim having two upstanding flanges, a demountable rim surrounding the fixed rim, and a plurality of bolts extending transversely through said flanges, clamping means associated with the bolts adapted to exert lateral pressure to force the demountable rim into place on the fixed rim, and integral lugs formed on the bolts at the rear of and contacting the flange adjacent the clamping means.

4. In a wheel construction, the combination of a fixed rim having two upstanding flanges, a demountable rim surrounding the fixed rim, and a plurality of bolts extending transversely through said flanges, clamping means associated with the bolts adapted to exert lateral pressure to force the demountable rim into place on the fixed rim and integral lugs formed on the bolts at the rear of and contacting the flange adjacent the clamping means, said bolts and the other of said flanges having a non-rotative connection.

JOSEPH G. SWAIN.